(12) United States Patent
Hummel et al.

(10) Patent No.: US 11,655,007 B2
(45) Date of Patent: May 23, 2023

(54) FLOATING WIND POWER PLATFORM WITH TENSION LEG DEVICE

(71) Applicant: FREIA OFFSHORE AB, Stockholm (SE)

(72) Inventors: Niklas Hummel, Saltsjöbaden (SE); Magnus Rahm, Uppsala (SE); Eduard Dyachyk, Enskededalen (SE)

(73) Assignee: FREIA OFFSHORE AB, Stockholm (SE)

( * ) Notice: Subject to any disclaimer, the term of this patent is extended or adjusted under 35 U.S.C. 154(b) by 0 days.

(21) Appl. No.: 16/962,690

(22) PCT Filed: Jan. 16, 2019

(86) PCT No.: PCT/SE2019/050028
§ 371 (c)(1),
(2) Date: Jul. 16, 2020

(87) PCT Pub. No.: WO2019/143283
PCT Pub. Date: Jul. 25, 2019

(65) Prior Publication Data
US 2020/0355162 A1 Nov. 12, 2020

(30) Foreign Application Priority Data

Jan. 19, 2018 (SE) .................................. 1850064-5
May 18, 2018 (SE) .................................. 1850590-9

(51) Int. Cl.
*B63B 35/44* (2006.01)
*F03D 13/25* (2016.01)
(Continued)

(52) U.S. Cl.
CPC .............. *B63B 35/44* (2013.01); *B63B 1/107* (2013.01); *B63B 21/502* (2013.01);
(Continued)

(58) Field of Classification Search
CPC ..... B63B 35/44; B63B 21/502; B63B 21/507; F03D 13/25
See application file for complete search history.

(56) References Cited

U.S. PATENT DOCUMENTS 4,468,157 A 8/1984 Horton
4,793,738 A † 12/1988 White
(Continued)

FOREIGN PATENT DOCUMENTS

CN 2727043 Y 9/2005
CN 203035449 U 7/2013
(Continued)

OTHER PUBLICATIONS

"Environmental Statement, Dounreay Trì Floating Wind Demonstration Project," Dounreay Trì Offshore Wind Farm, Sep. 16, 2016.
(Continued)

*Primary Examiner* — Anthony D Wiest
(74) *Attorney, Agent, or Firm* — Duane Morris LLP; Gregory M. Lefkowitz; Randall C. Pyles

(57) ABSTRACT

A floating wind power platform for offshore power production, comprising: a floating unit, wherein the floating unit comprises a first, a second and a third interconnected semisubmersible column each being arranged in a respective corner of the floating unit, wherein a tension leg device is arranged to the third semisubmersible column, wherein the tension leg device is adapted to be anchored to the seabed by an anchoring device, and wherein the third semisubmersible column provides a buoyancy force adapted to create a tension force in the tension leg device, wherein the floating wind power platform is further adapted to weather vane in relation to the wind direction.

10 Claims, 4 Drawing Sheets

(51) Int. Cl.
    *B63B 1/10*    (2006.01)
    *B63B 21/50*   (2006.01)
    *B63B 1/12*    (2006.01)

(52) U.S. Cl.
    CPC ............ *B63B 21/507* (2013.01); *F03D 13/25* (2016.05); *B63B 2001/128* (2013.01); *B63B 2035/446* (2013.01); *B63B 2241/08* (2013.01); *F05B 2240/93* (2013.01); *F05B 2240/95* (2013.01); *F05B 2240/96* (2013.01)

(56) References Cited

U.S. PATENT DOCUMENTS

| | | |
|---|---|---|
| 2006/0269396 A1 | 11/2006 | Borgen |
| 2011/0006539 A1 | 1/2011 | Lefranc |
| 2011/0311360 A1 | 12/2011 | Nedreboe |
| 2011/3011360 † | 12/2011 | Nedrebø |
| 2012/0043763 A1 † | 2/2012 | De Boer |
| 2012/0093648 A1 | 4/2012 | Roeyseth |
| 2013/0272846 A1 † | 10/2013 | Inoue |
| 2015/0354532 A1 † | 12/2015 | Nielsen |
| 2015/0367918 A1 | 12/2015 | Roddier et al. |
| 2016/0061192 A1 | 3/2016 | Guyot |
| 2016/0177927 A1 † | 6/2016 | Saeki |
| 2016/0195070 A1 | 7/2016 | Li |
| 2016/0368572 A1 † | 12/2016 | Bergua |
| 2017/0218919 A1 † | 8/2017 | Wong |
| 2019/0211804 A1 | 7/2019 | Siegfriedsen |
| 2020/0173422 A1 | 6/2020 | Casanovas Bermejo et al. |

FOREIGN PATENT DOCUMENTS

| | | |
|---|---|---|
| CN | 105799873 A | 7/2016 |
| CN | 106476991 A | 3/2017 |
| EP | 0716011 A1 | 6/1996 |
| WO | 02073032 | 9/2002 |
| WO | 2011137903 | 11/2011 |
| WO | 2011137903 A2 † | 11/2011 |
| WO | 2013155521 | 10/2013 |

OTHER PUBLICATIONS

"Floating wind power for Taiwan—What we can learn from Dounreay Tri in Scotland," Hexicon, May 18, 2016.
"Floating Foundations: A Game Change for Offshore Wind Power," International Renewable Energy Agency, IRENA , 2016, Abu Dhabi.
Printing of web page from Wayback Machine http://hexicon.konjin.com/dounreay-tri/, Oct. 14, 2017.
Print of "Deepwater" from https://www.eti.co.uk/programmes/offshore-wind/deep-water, Jun. 17, 2021.
"Marine Renewable Integrated Application Platform—Final Summary Report," Commission of the European Communities, 7th Framework Programme, Jun. 2010 to Jun. 2014.
"Informationsmemorandum," Hexicon AB, Jan. 2018.
Sadeghi, K., "An Overview of Design, Analysis, Construction and Installation of Offshore Petroleum Platforms Suitable fro Cyprus Oil/Gas Fields," GAU J. Sac. & Appl. Sci., 2017, 2(4), 1-16.
Suzuki, K. et al., "Initial Design of Tension Leg Platform for Offshore Wind Farm," Journal of Fluid Science and Technology, Apr. 2011, 6(3):372-381.
Hummel, N., et al., "Floating Multiple Wind Turbine Platforms," The Journal of Ocean Technology, 2015, vol. 10, No. 4, pp. 1-10.
Hanssen, J.E., et al., "Design and Performance Validation of a Hybrid Offshore Renewable Energy Platform," 2015 Tenth International Conference of Ecological Vehicles and Renewable Energies (EVER). Jun. 2015.
Kibbee, S., "TLP Technology SeaStar minimal platform for small deepwater reserves," Offshore Magazine, Jun. 1, 1996, www.offshore-mag.com/deepwater/article/16759274/tp-technology-seastar-minimal-platform-for-small-deepwater-reserves.
Hexicon, Doubling up on economy of scale-Hexicon to install 10MW floating multi turbine platform, published Mar. 31, 2017, at http://www.norcowe.no/doc//PDF%20files/SMI%20Stavanger%20mars%202017/Doubling%20up%20on%20economy%20scale%20-%20Hexicon%20to%20install%2010%20MW%20floating%20multi%20turbine%20platform.pdf (website linking to document archived Jul. 4, 2017, on Internet Archive Wayback Machine, available at https://web.archive.org/web/20170704044253/www.norcowe.no/index.cfm?id=434792, archive retrieved Jun. 11, 2021).†
EERA DeepWind 2016, Hanssen, et. al, a paper presented by Pedro Mayorga on Jan. 20-22, 2016 at 13th Deep Sea Offshore Wind R&D Conference, Trondheim (Norway), publicly available at https://www.sintef.no/globalassets/project/eera-deepwind2016/presentations/g2_mayorga.pdf.†

† cited by third party

FLOATING WIND POWER PLATFORM WITH TENSION LEG DEVICE

CROSS-REFERENCE TO RELATED APPLICATIONS

This application is a § 371 national stage entry of International Application No. PCT/SE2019/050028, filed Jan. 16, 2019, which claims priority of Sweden National Application No. 1850064-5, filed Jan. 19, 2018, and Sweden National Application No. 1850590-9, filed May 18, 2018, the entire contents of which are incorporated herein by reference.

TECHNICAL FIELD

The present invention relates generally to floating wind power platform.

BACKGROUND ART

It is known to use a catenary mooring system as anchoring system for floating wind power platforms for offshore power production. A catenary mooring system comprises a plurality of mooring points in the sea bed via catenaries. In order to increase stability of such floating wind power platforms in the horizontal plane, essentially to keep the platform upright in windy conditions and to prevent them from falling over, size, shape as well as weight distribution are critical parameters that need to be well balanced. For instance, larger platforms comprising a plurality of towers and turbines may often be adapted for weather vaning, and need to have a sufficient distance from the rotation point to the towers, but may also require a sufficient weight at the point of rotation to be sufficiently stable. Achieving stability for larger weather vaning systems are thus critical. Mooring in the above mentioned prior art provides and has the sole purpose of station keeping of the platform, but has no impact on the stability and the platforms are constructed to have similar movement patterns in the sea regardless if they are anchored to the sea bed via the anchoring system or not. The inherited characteristic of the catenary mooring systems is further that a significant weight in mooring lines are necessary to create sufficient tension in mooring line holding force and system stiffness at the seabed. Thus, the catenary mooring systems further require a significant use of the seabed space as well as material.

A drawback with known solutions is that the floating units are material—as well as space consuming, whereby both manufacturing and transport is expensive. As a result, the manufacturing cost further increases.

SUMMARY OF INVENTION

An object of the present invention is to alleviate some of the disadvantages of the prior art and to provide a floating wind power platform with weather vaning capabilities which requires less material during manufacturing, is cheaper to manufacture and is less space consuming and more compact yet provide sufficient stability. A further object of the present invention is to provide a floating wind power platform with an increased efficiency.

According to one embodiment, a floating wind power platform for offshore power production is provided, comprising: a floating unit, wherein the floating unit comprises a first, a second and a third interconnected semisubmersible column each being arranged in a respective corner of the floating unit, wherein a tension leg device is arranged to the third semisubmersible column, wherein the tension leg device is adapted to be anchored to the seabed by an anchoring device, and wherein the third semisubmersible column provides a buoyancy force adapted to create a tension force in the tension leg device, wherein the floating wind power platform is further adapted to weather vane in relation to the wind direction.

According to one embodiment, the third semisubmersible column provides an excess buoyancy force adapted to create a tension force in the tension leg device.

According to one embodiment, a tension leg device is arranged solely to the third semisubmersible column.

According to one embodiment, the tension leg device is arranged to the base end portion of the third semisubmersible column, wherein a diameter $D_{3c}$ of the third semisubmersible column $3c$ is in the interval of $0.1*D_{30c} \leq D_{3c} \leq 0.3*D_{30c}$ in relation to a diameter $D_{30c}$ of the base end portion of the semisubmersible column.

According to one embodiment, a diameter $D_{3c}$ of the third semisubmersible column $3c$ is in the interval of $0.2*D_{3a/3b} \leq D_{3c} \leq 0.6*D_{3a/3b}$ in relation to the diameter $D_{3a/3b}$ of the first and second semisubmersible columns, respectively.

According to one embodiment, the base end portion of the third semisubmersible column is adapted to be entirely submersed in the water.

According to one embodiment, the tension leg device comprises at least one tension leg device member.

According to one embodiment, the tension leg device comprises a plurality of tension leg device members.

According to one embodiment, the tension leg device is adapted to be arranged essentially vertically between the sea bed and the third semisubmersible column.

According to one embodiment, the tension leg device is adapted to be arranged radially outwards with an angle β with respect to a reference direction z between the sea bed and the third semisubmersible column.

According to one embodiment, the angle β is in the interval of $0° \leq \beta \leq 45°$.

According to one embodiment, the at least one tension leg device member comprises any one of tension mooring lines, cables, chains, ropes, wires or tubular steel members.

According to one embodiment, the tension leg device is adapted to be anchored to the seabed, by an anchoring device.

According to one embodiment, a turret is arranged to the third semisubmersible column.

According to one embodiment, the floating unit is shaped as a triangle wherein the corners of the triangle form the corners of the floating unit.

According to one embodiment, the height h of the triangle is in the range of 30 m≤h≤70 m, more preferably 40 m≤h≤60 m, most preferably 45 m≤h≤55 m.

According to one embodiment, the floating wind power platform further comprising a first and second wind turbine, arranged to the first and second semisubmersible columns, respectively, via a first and second tower respectively.

According to one embodiment, the reference direction z is a vertical direction z.

According to one embodiment, the interconnected semisubmersible column each having a longitudinal column central axis, wherein the first and second towers have a first and second longitudinal tower central axis, respectively, wherein the first and second semisubmersible columns are arranged in the floating unit with a first and second angle $\alpha_1$, $\alpha_2$ respectively, with respect to a reference direction z, and directed away from each other, wherein the first and second longitudinal tower central axes are parallel to the first and second longitudinal column central axes, respectively.

According to one embodiment, the first and second angles $\alpha_1$, $\alpha_2$ are the same.

According to one embodiment, the first and second angles are in the interval of $5° \leq \alpha_1, \alpha_2 \leq 25°$, more preferably $10° \leq \alpha_1, \alpha_2 \leq 20°$, most preferably $12° \leq \alpha_1, \alpha_2 \leq 17°$.

According to one embodiment, the first and second angles $\alpha_1$, $\alpha_2$ are $15°$ According to one embodiment, the floating unit comprises a truss structure.

According to one embodiment, the semisubmersible columns are interconnected to each other via upper connection members and parallelly arranged corresponding lower connection members, wherein the lower connection members are shorter than the upper connection members.

According to one embodiment, the first and second towers are interconnected to the first and second semisubmersible column, respectively.

According to one embodiment, abutment surfaces, forming interfaces between the first and second towers and the first and second semisubmersible columns, respectively, have a normal direction parallel to the first and second longitudinal tower central axes and the first and second longitudinal column central axes, respectively.

According to one embodiment, the first and second towers are integral with and forms the first and second semisubmersible columns.

According to one embodiment, the diameter and cross-sectional area of the first and second towers and the first and second semisubmersible columns, respectively, are similar.

According to one embodiment, the first and second semisubmersible columns span a plane, wherein the plane has a normal direction in a horizontal direction.

According to one embodiment, the first and second longitudinal tower central axes are aligned with the first and second longitudinal column central axes, respectively.

According to one embodiment, first and second supporting members are arranged to interconnect the first and second towers with the floating unit respectively.

According to one embodiment, the anchoring device 60 comprises a weight adapted to be arranged on the sea bed 8 by gravity.

According to one embodiment, the anchoring device comprises at least one anchoring device member adapted to be anchored to the sea bed.

According to one embodiment, the anchoring device comprises a plurality of anchoring device members adapted to be anchored to the sea bed.

According to one embodiment, the at least one anchoring device member is a suction pile anchor.

According to one embodiment of the invention, a floating wind power platform for offshore power production is provided, comprising, a floating unit, wherein the floating unit comprises a first, a second and a third interconnected semisubmersible column each having a longitudinal column central axis and each being arranged in a respective corner of the floating unit, a first and second wind turbine, arranged to the first and second semisubmersible columns, respectively, via a first and second tower respectively, wherein the first and second towers have a first and second longitudinal tower central axis, respectively, wherein the first and second semisubmersible columns are arranged in the floating unit with a first and second angle ($\alpha_1$, $\alpha_2$) respectively, with respect to a reference direction (z), and directed away from each other, wherein the first and second longitudinal tower central axes are parallel to the first and second longitudinal column central axes, respectively.

According to one embodiment, the first and second angles ($\alpha_1$, $\alpha_2$) are the same.

According to one embodiment, the first and second angles are in the interval of $5° \leq (\alpha_1, \alpha_2) \leq 25°$, more preferably $10° \leq (\alpha_1, \alpha_2) \leq 20°$, most preferably $12° (\alpha_1, \alpha_2) 17°$.

According to one embodiment, the first and second angles ($\alpha_1$, $\alpha_2$) are $15°$.

According to one embodiment, the floating unit is shaped as a triangle wherein the corners of the triangle form the corners of the floating unit.

According to one embodiment, the floating unit comprises a truss structure.

According to one embodiment, the semisubmersible columns are interconnected to each other via upper connection members and parallelly arranged corresponding lower connection members, wherein the lower connection members are shorter than the upper connection members.

According to one embodiment, the first and second towers are interconnected to the first and second semisubmersible column, respectively.

According to one embodiment, abutment surfaces, forming interfaces between the first and second towers and the first and second semisubmersible columns, respectively, have a normal direction parallel to the first and second longitudinal tower central axes and the first and second longitudinal column central axes, respectively.

According to one embodiment, the first and second towers are integral with and forms the first and second semisubmersible columns.

According to one embodiment, the diameter and cross-sectional area of the first and second towers and the first and second semisubmersible columns, respectively, are similar.

According to one embodiment, the first and second semisubmersible columns span a plane, wherein the plane has a normal direction in a horizontal direction.

According to one embodiment, the first and second longitudinal tower central axes are aligned with the first and second longitudinal column central axes, respectively.

According to one embodiment, first and second supporting members are arranged to interconnect the first and second towers with the floating unit respectively.

According to one embodiment, the floating wind power platform is further adapted to weather vane in relation to the wind direction.

According to one embodiment, the reference direction (z) is a vertical direction (z).

BRIEF DESCRIPTION OF DRAWINGS

The invention is now described, by way of example, with reference to the accompanying drawings, in which.

DESCRIPTION OF EMBODIMENTS

Figure 1:
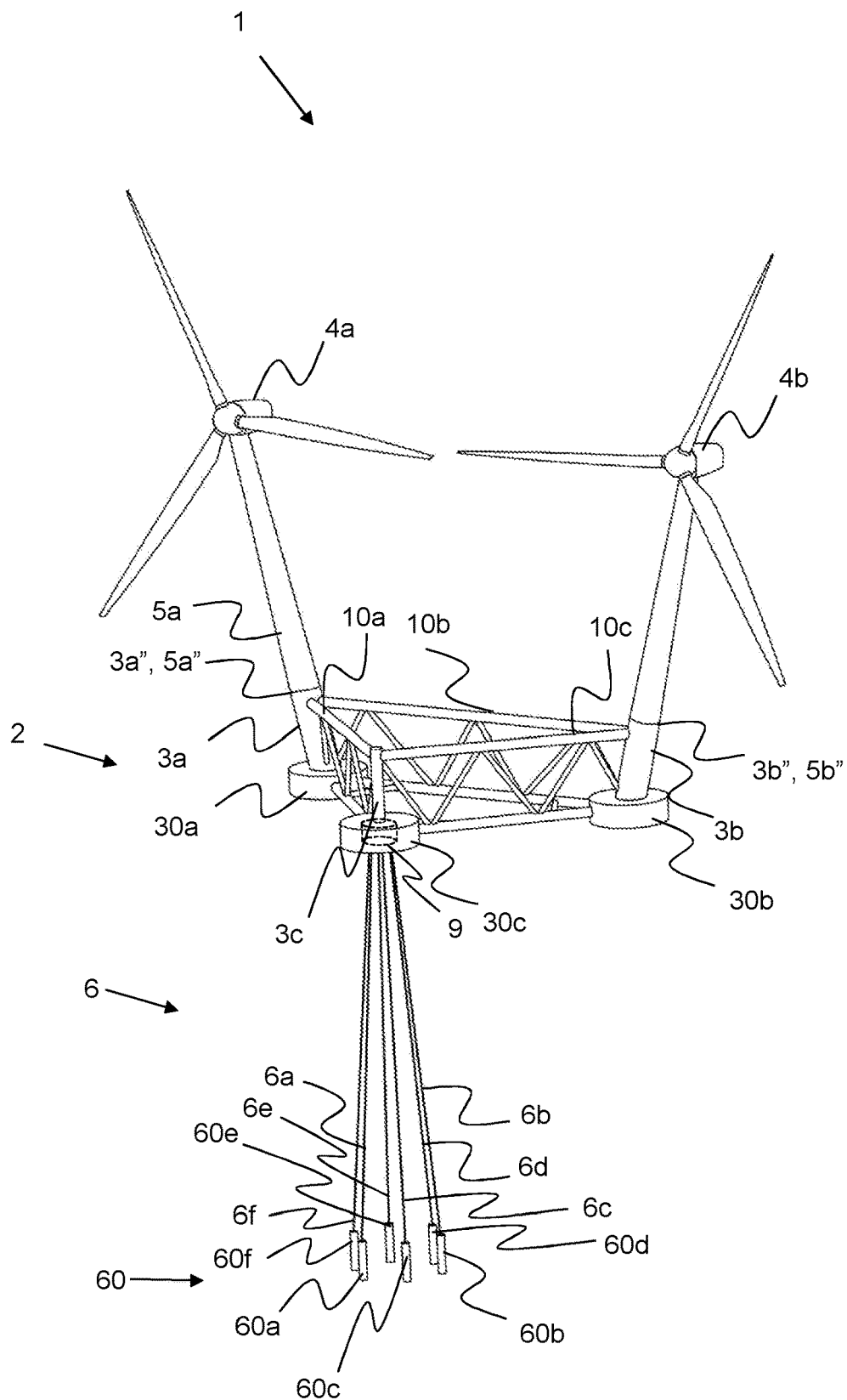
FIG. 1 shows a perspective view of a floating wind power platform for offshore power production.

In the following, a detailed description of the invention will be given. In the drawing figures, like reference numerals designate identical or corresponding elements throughout the several figures. It will be appreciated that these figures are for illustration only and are not in any way restricting the scope of the invention. Swedish patent application 1850064-5 by the applicant is hereby incorporated by reference in its entirety. Protection may be sought for features in the referenced document Swedish patent application 1850064-5.

FIG. 1 shows a perspective view of a floating wind power platform 1 for offshore power production comprising a floating unit 2. According to one embodiment, the floating unit 2 comprises three interconnected semisubmersible columns 3a, 3b, 3c, i.e. a first, a second, and a third semisubmersible column 3a, 3b, 3c, each having a longitudinal column central axis 3a', 3b', 3c' as can be further seen in FIG. 2. According to one embodiment, the floating unit 2 comprises a plurality of semisubmersible columns. According to one embodiment, the floating unit 2 comprises more than three semisubmersible columns. According to one embodiment, the floating unit 2 comprises at least three semisubmersible columns 3a, 3b, 3c. According to one embodiment, the semisubmersible columns are interconnected to each other via at least three connection members 10a, 10b, 10c, 20a, 20b, 20c. In the case of a floating unit 2 comprising more than three semisubmersible columns, the first, second and third semisubmersible columns may be indirectly interconnected to each other. According to one embodiment, the semisubmersible columns are interconnected to each other via upper connection members 10a, 10b, 10c and parallelly arranged corresponding lower connection members 20a, 20b, 20c. According to one embodiment, the lower connection members 20a, 20b, 20c are shorter than the upper connection members 10a, 10b, 10c. As a result, the total use of material in the floating unit 2 may be reduced as compared to a floating unit 2 of upper and lower connection members of similar length. According to one embodiment, the normal water level or water line 7 during use of the floating wind power platform 1 is half the distance between the upper connection members 10a, 10b, 10c, and the lower connection members 20a, 20b, 20c, respectively. According to one embodiment, the semisubmersible columns are each being arranged in a respective corner of the floating unit 2. According to one embodiment, the semisubmersible columns are buoyant structures. According to one embodiment, the semisubmersible columns extend to and has an upper end at least above the upper connection members 10a, 10b, 10c. According to one embodiment, the semisubmersible columns 3a, 3b, 3c have a respective base end portion 30a, 30b, 30c of increased diameter which increases the buoyancy and the displacement of the semisubmersible columns 3a, 3b, 3c as well as their respective areas and thus resistance to move in the water. According to one embodiment, the base end portions 30a, 30b, 30c are cylinder shaped comprising a central axis 30a', 30b', 30c' respectively (not shown), wherein each central axis 30a', 30b', 30c' is parallel to a reference direction z. According to one embodiment, the distance between the central axis 30a' and central axis 30b' is approximately 100 m, also referred to as the length of the platform. According to one embodiment, the distance between the central axis 30c' and either of central axis 30a' or 30b' is approximately 70 m. According to one embodiment, the reference direction z is essentially parallel to or parallel to a normal direction of a plane spanned by the end points of the of the longitudinal column central axes 3a', 3b', 3c' on the respective semisubmersible columns 3a, 3b, 3c. According to one embodiment, the reference direction z is essentially parallel to or parallel to a normal direction of a plane spanned by the upper connection members 10a, 10b, 10c, or alternatively, the lower connection members 20a, 20b, 20c, or both. According to one embodiment the reference direction z is essentially parallel to or parallel to a vertical line or a plumb line during normal use of the wind power platform 1. According to one embodiment the reference direction z is a vertical direction z. According to one embodiment, the floating unit 2 is shaped as a triangle wherein the corners of the triangle form the corners of the floating unit 2. According to one embodiment the triangle is an isosceles triangle. According to one embodiment, the connection members 10a, 10c, and/or 20a, 20c have different lengths, respectively thus forming a non-isosceles or non-uniform, i.e. and oblique triangle. According to one embodiment, the floating unit is shaped as a polygon with semisubmersible columns in each corner. According to one embodiment, semisubmersible columns may be arranged centrally in the floating unit 2. According to one embodiment, the floating unit 2 comprises a truss structure. According to one embodiment, the floating unit 2 comprises a framework structure. According to one embodiment, a plurality of connection members are arranged to interconnected upper and lower connection members.

Figure 2:
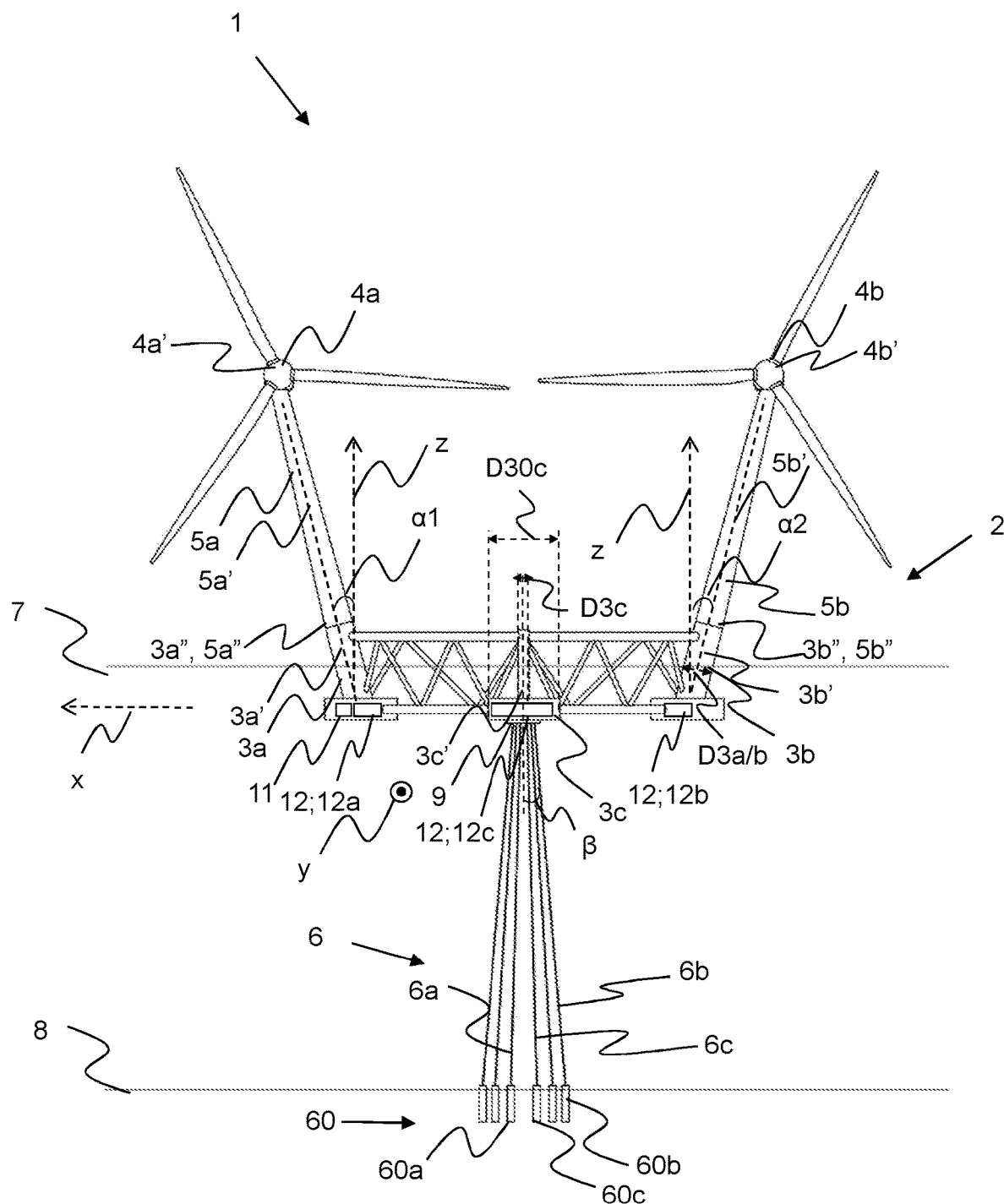
FIG. 2 shows a side view of the floating wind power platform according to FIG. 1.

According to one embodiment, a tension leg device 6 is arranged to the third semisubmersible column 3c, wherein the tension leg device 6 is adapted to be anchored to the seabed 8. According to one embodiment, the tension leg device 6 is arranged to the base end portion 30c of the third semisubmersible column 3c. According to one embodiment, the base end portion 30c of the third semisubmersible column 3c has a significantly increased diameter compared to the third semisubmersible column 3c. According to one embodiment, as can be further seen in FIG. 2, diameter $D_{3c}$ of the third semisubmersible column 3c is in the interval of $0.1*D_{30c} \leq D_{3c} \leq 0.3*D_{3c}$ in relation to the diameter $D_{30c}$ of the base end portion 30c of the semisubmersible column 3c. According to one embodiment, diameter $D_{3c}$ of the third semisubmersible column 3c is in the interval of $0.2*D_{3a/3b} \leq D_{3c} \leq 0.6*D_{3a/3b}$ in relation to the diameter $D_{3a/3b}$ of the first and second semisubmersible columns 3a, 3b, respectively. According to one embodiment, the diameter $D_{3a/3b}$ of the first and second semisubmersible columns 3a, 3b is measured at the water line 7 during use. According to one embodiment, the diameter $D_{3c}$ of the third semisubmersible columns 3c is measured at the water line 7 during use. According to one embodiment, the third semisubmersible column 3c has a diameter which is significantly smaller than the diameter of the first and second semisubmersible columns 3a, 3b. According to one embodiment, the diameter of the semisubmersible columns 3a, 3b are in the interval of 5 m$\leq D_{3a/3b} \leq$10 m. According to one embodiment, the diameter of the semisubmersible columns 3a, 3b are in the interval of 6 m$\leq D_{3a/3b} \leq$8 m. According to one embodiment, reducing the diameter $D_{3c}$ in relation to $D_{30c}$ provides a reduced water line area of the third semisubmersible column 3c which reduces the exposure to waves and thus risk of resulting unwanted movements of the floating wind power platform 1. According to one embodiment, the third semisubmersible column 3c provides a buoyancy force adapted to create a tension force in the tension leg device 6. According to one embodiment, the third semisubmersible column 3c provides an excess buoyancy force adapted to create a tension force in the tension leg device 6. According to one embodiment, excess buoyancy is defined as a buoyancy occurring when weight of the displaced water is higher than the weight of the platform 1. According to one embodiment, the upward directed force is held by the tension leg device 6 preventing the rising of the platform 1. According to one embodiment, during excess buoyancy, the buoyancy of the platform 1 exceeds its weight creating a rising or upward directed force on the platform 1 in a z direction. According to one embodiment, stability of the floating wind power platform 1 is provided by excess buoyancy and the resulting tension force in the tension leg device 6. According to one embodiment, stability of the floating wind power platform is provided partially by the platform buoyancy and partially from the tension leg device mooring system with weather vaning capability. According to one embodiment, the base end portion 30*c* of the third semisubmersible column 3*c* is adapted to be entirely submersed in the water. According to one embodiment, the base end portion 30*c* of the third semisubmersible column 3*c* is adapted to be entirely submersed below the water line 7, or mean sea level 7, as seen in FIG. 2. According to one embodiment, the tension leg device 6 is arranged solely to the third semisubmersible column, i.e. the first and second semisubmersible columns 3*a*, 3*b* are not provided with respective tension leg devices 6. According to one embodiment, the tension leg device 6 comprises at least one tension leg device member 6*a*, 6*b*, 6*c*, 6*d*, 6*e*, 6*f*. According to one embodiment, the tension leg device 6 comprises a plurality of tension leg device members 6*a*, 6*b*, 6*c*, 6*d*, 6*e*, 6*f*. According to one embodiment, the tension leg device 6 comprises at least six tension leg device members 6*a*, 6*b*, 6*c*, 6*d*, 6*e*, 6*f*. According to one embodiment, the tension leg device 6 comprises at least six tension leg device members 6*a*, 6*b*, 6*c*, 6*d*, 6*e*, 6*f* but may require any suitable number of tension leg device members 6*a*, 6*b*, 6*c*, 6*d*, 6*e*, 6*f* based on the application or environmental conditions. According to one embodiment, the tension leg device 6 is adapted to be arranged essentially vertically between the sea bed 8 and the first semisubmersible column 3*c*. According to one embodiment, the tension leg device 6 is adapted to be arranged vertically between the sea bed 8 and the first semisubmersible column 3*c*. According to one embodiment, the tension leg device members 6*a*, 6*b*, 6*c*, 6*d*, 6*e*, 6*f* are adapted to be arranged with an angle β with respect to the reference direction z between the sea bed 8 and the third semisubmersible column 3*c*. According to one embodiment, at least one of the tension leg device members 6*a*, 6*b*, 6*c*, 6*d*, 6*e*, 6*f* are adapted to be arranged with an angle β with respect to the reference direction z between the sea bed 8 and the third semisubmersible column 3*c*. According to one embodiment, the tension leg device members 6*a*, 6*b*, 6*c*, 6*d*, 6*e*, 6*f* are adapted to be arranged radially outwards with an angle β with respect to the reference direction z which is in the interval of $0° \leq \beta \leq 45°$ According to one embodiment, the at least one tension leg device member 6*a*, 6*b*, 6*c*, 6*d*, 6*e*, 6*f* comprises tension mooring lines or cables or chains or ropes or wires. According to one embodiment, the at least one tension leg device member 6*a*, 6*b*, 6*c*, 6*d*, 6*e*, 6*f* comprises tubular steel members sometimes referred to as tendons. According to one embodiment, the tension leg device 6 is adapted to be anchored to the sea bed 8 by an anchoring device 60. According to one embodiment, the anchoring device 60 comprises a weight adapted to be arranged on the sea bed 8 by gravity. According to one embodiment, the anchoring device 60 comprises at least one anchoring device member 60*a*, 60*b*, 60*c*, 60*d*, 60*e*, 60*f* adapted to be anchored to the sea bed 8. According to one embodiment, the anchoring device 60 comprises a plurality of anchoring device members 60*a*, 60*b*, 60*c*, 60*d*, 60*e*, 60*f* adapted to be anchored to the sea bed 8. According to one embodiment, each tension leg device member 6*a*, 6*b*, 6*c*, 6*d*, 6*e*, 6*f* is provided with an anchoring device member 60*a*, 60*b*, 60*c*, 60*d*, 60*e*, 60*f* respectively. According to one embodiment, the anchoring devices members 60*a*, 60*b*, 60*c*, 60*d*, 60*e*, 60*f* are suction pile anchors.

According to one embodiment, the floating wind power platform 1 is adapted to weather vane in relation to the wind direction. According to one embodiment, weather vaning is provided by a turret 9 arranged to the floating unit 2. According to one embodiment, the turret 9 is arranged to one of the semisubmersible columns 3*a*, 3*b*, 3*c*. According to one embodiment the turret 9 is arranged to the third semisubmersible column 3*c*. According to one embodiment, the turret 9 is arranged to the base end portion 30*c* of the third semisubmersible column 3*c*. According to one embodiment, the turret 9 is interconnected to a mooring system. According to one embodiment, the turret 9 is interconnected to the tension leg device 6. According to one embodiment the turret 9 is interconnected to the tension leg device 6 via the third semisubmersible column 3*c*.

According to one embodiment, as can be further seen in FIG. 2, the weight distribution, or center of gravity may be changed in the platform 1 by a ballast system 12. The platform 1 comprises the ballast system 12, wherein the ballast system 12 comprises ballast tanks 12*a*, 12*b* provided in at least the first and second semisubmersible columns 3*a*, 3*b*, respectively. According to one embodiment, the ballast system 12 comprises ballast tanks 12*a*, 12*b*, 12*c* provided in at least the first, second and third semisubmersible columns 3*a*, 3*b*, 3*c*, respectively. A control system 11 adapted to control the amount of water in the ballast tanks is further provided. According to one embodiment, the ballast system 12 enables leveling of the platform 1 e.g. during changes of water level between ebb and flow. According to one embodiment, controlling the amount of water in the ballast tank 12*c* in the third semisubmersible column 3*c* enables controlling the draught and buoyancy of the semisubmersible column 3*c* whereby the tension force in the tension leg device 6 may further be controlled. According to one embodiment, provisional or temporary stability during transportation and installation of the platform 1 may be achieved by using a reduced amount of ballast water in the ballast tanks 12*a*, 12*b*, 12*c* which provide a reduced draught of the platform 1 causing the base end portion 30*c* of the third semisubmersible column 3*c* to be at the water line 7 increasing the water line area and the stability during transportation and installation. According to one embodiment, provisional or temporary stability during transportation and installation of the platform 1 may be achieved by arranging a provisional or temporary volume on the third semisubmersible column 3*c* providing additional buoyancy, whereby the water line area is increased and consequently the stability of the platform 1 during transportation and installation of the same. According to one embodiment the volume is bolted or welded onto the third semisubmersible column 3*c*. As a step of the installation, the volume is removed from the third semisubmersible column 3*c* whereby the tension leg device 6 is arranged to the third semisubmersible column 3*c*.

In prior art solutions in general, weather vaning platforms or structures get all their stability from buoyancy forces. Mooring in such prior art provides and has the sole purpose of station keeping. Weather vaning platforms or structures needs extra stability as they rotate around one point at which they are connected to the sea bed and otherwise float freely based on the buoyancy of the structure. Such structures are usually large as weather vaning enables using a plurality of towers on the same platform in an efficient manner. The larger size reflects both the required displacement as well as structure size. Sufficient distance from the towers to the rotation point in a y-direction is required, as is a sufficient weight and buoyancy and thus material at the rotation point to provide a stable platform. The platform or structure with weather vaning capabilities of the prior art are consequently constructed to be inherently stable and would not fall over even if they would be disconnected from the sea bed. At the same time, the larger size of weather vaning platforms to achieve sufficient stability may have negative implications on their ability to rotate during weather vaning, as the larger displacement also in relation to tower size results in a slowness to move in the water and thus adapt to changes in the weather conditions such as e.g wind direction. Further, a larger displacement would make the platform more inclined to adapt to changes in water current direction than wind direction which have negative implications on the resulting equilibrium state of the platform 1 from current and wind. Overall, this causes a drawback of reduced efficiency of such platforms.

According to one embodiment, the triangle forming the floating unit 2 has a height, i.e. a distance from the upper connection member 10b to the third semisubmersible column 3c in the y-direction which can be significantly reduced compared to floating units of wind power platforms which do not rely on constant tension force in the tension leg device 6 according to the embodiment of the invention. The height is also referred to as the platform beam or platform width.

According to one embodiment, the platform height or beam may be reduced by between 40-60% compared to such wind power platforms of the prior art. According to one embodiment, the platform beam is approximately 50 meters wherein the platform length, as described in [0031], is approximately 100 meters. According to one embodiment, the height h of the triangle is in the range of 30 m≤h≤70 m, more preferably 40 m≤h≤60 m, most preferably 45 m≤h≤55 m. According to one embodiment, the ratio $r_{b-hh}$ of the beam of the platform 1 and the hub-height, i.e. distance from the water line 7 during use, to the rotational axis 4a', 4b' of the turbine rotors at its intersection of the first and second longitudinal tower central axis 5a', 5b' respectively, is in the interval of $0.3 \leq r_{b-hh} \leq 0.70$, more preferably $0.4 \leq r_{b-hh} \leq 0.60$, most preferably $0.55 \leq r_{b-hh} \leq 0.6$. According to one embodiment, the ratio $r_{b-rd}$ of the beam of the platform 1 and the rotor diameter is in the interval of $0.25 \leq r_{b-rd} \leq 0.60$, more preferably $0.3 \leq r_{b-rd} \leq 0.55$, most preferably $0.35 \leq r_{b-rd} \leq 0.50$. As previously discussed herein, the invention enables lower ratios above than in prior art solutions, which reduces cost and increases efficiency of the platform 1.

According to one embodiment, the floating wind power platform comprises a first and second wind turbine 4a, 4b, arranged to a first and second semisubmersible column 3a, 3b, respectively, via a first and second tower 5a, 5b, respectively. According to one embodiment, if the floating unit 2 comprises more than three semisubmersible columns, further wind turbines may be arranged in the floating unit 2, e.g. on semisubmersible columns. According to one embodiment, if further wind turbines are arranged in the floating unit 2, they may be arranged in a row. According to one embodiment, a turret is attached to a third semisubmersible column 3c. According to one embodiment, the first and second tower 5a, 5b has a first and second longitudinal tower central axis 5a', 5b', respectively as can be further seen in FIG. 2. According to one embodiment, the first and second towers 5a, 5b are interconnected to the first and second semisubmersible column 3a, 3b, respectively. According to one embodiment, if three semisubmersible columns are arranged in a row, the middle semisubmersible column and wind tower may have a longitudinal column central axis and longitudinal tower central axis that are parallel to the reference direction z. According to one embodiment, the diameter and cross-sectional area of the first and second towers 5a, 5b and the first and second semisubmersible columns 3a, 3b respectively, are similar. According to one embodiment, abutment surfaces 3a", 5a" and 3b", 5b" forming interfaces between the first and second towers 5a, 5b and the first and second semisubmersible columns 3a, 3b, respectively, have a normal direction parallel to the first and second longitudinal tower central axes 5a', 5b' and first and second longitudinal column central axes 3a', 3b', respectively. According to one embodiment, the abutment surfaces 3a", 5a" and 3b", 5b" have a circular ring shape. According to one embodiment, the abutment surfaces 3a", 5a" and 3b" 5b" have a circular area shape. Thus, the selection of such normal direction of the abutment surfaces enables the use of circular, circular ring or circular areas as opposed to elliptically shaped abutment surfaces resulting from abutment surfaces of the towers and/or columns having a normal direction being non-parallel to the longitudinal tower central axis and/or longitudinal column central axis. The shaping of elliptical abutment surfaces is difficult to achieve with a sufficient accuracy to enable the necessary fit between two elliptical abutment surfaces required during attachment between the tower 5a, 5b and the semisubmersible column 3a, 3b. This is particularly so since the abutment surfaces are commonly shaped as bolt flanges comprising holes for bolts or bolted connections which need to match during attachment procedure. As a result, standard wind towers 5a, 5b may be used for the floating wind power platform 1 according to the invention and no specially made or designed wind towers have be used which would increase the cost of manufacture. Further, if both tower 5a", 5b" and column abutment surfaces 3b", 5b" have a normal direction parallel to the respective longitudinal tower central axis 5a', 5b' and longitudinal column central axis 3a', 3b', the difficulty of trying to combine and attach a circular, circular ring, or circular area shape to an elliptical, elliptical ring, elliptical area shape respectively is avoided. According to one embodiment, the first and second towers 5a, 5b are integral with and forms the first and second semisubmersible columns 3a, 3b.

FIG. 2 shows a side view of the floating wind power platform 1 for offshore power production as seen essentially in a direction parallel to a rotational axis 4a', 4b' of the turbine rotors. According to one embodiment, the first and second semisubmersible columns 3a, 3b are arranged in the floating unit 2 with a first and second angle $\alpha_1$, $\alpha_2$ respectively, with respect to a reference direction z, and directed away from each other. According to one embodiment, being directed away from each other also means that the wind turbines are farther away from each other than other portions of their respective semisubmersible columns 3a, 3b, or at least the lowermost base end portion of the semisubmersible columns 3a, 3b. According to one embodiment, the first and second semisubmersible columns 3a, 3b are directed away from each other with a total angle corresponding to $\alpha_1 + \alpha_2$ seen in a plane spanned by the first and second semisubmersible columns 3a, 3b. According to one embodiment, the first and second longitudinal tower central axes 5a', 5b' are parallel to the first and second longitudinal column central axes 3a', 3b', respectively. According to one embodiment the first and second longitudinal tower central axis 5a', 5b' is aligned with the first and second longitudinal column central axis $3a'$, $3b'$, respectively. According to one embodiment the inclination of the first and second semisubmersible columns $3a$, $3b$ and first and second towers $5a$, $5b$ enables a more compact floating unit 2, while at the same time the distance between the wind turbines $4a$, $4b$ can be kept at a sufficient or similar distance as without the inclination, thereby also enabling the use of sufficiently large or similarly sized turbine rotor blades for the energy production, as without the inclination. In this sense, the floating unit 2 aims to optimize the size/cost vs its ability of energy production. According to one embodiment the first and second angles $\alpha_1$, $\alpha_{12}$ are the same. According to one embodiment, the first and second angles are in the interval of $5°\leq(\alpha_1, \alpha_2)\leq25°$, more preferably $10°\leq(\alpha_1, \alpha_2)\leq20°$, most preferably $12°\leq(\alpha_1, \alpha_2)\leq17°$. According to one embodiment, the first and second angles $(\alpha_1, \alpha_2)$ are 15°. As a further effect of using first and second semisubmersible columns $3a$, $3b$ that are arranged in the floating unit 2 with a first and second angle $\alpha_1$, $\alpha_2$ respectively, with respect to a reference direction z, a floating unit 2 with a higher water line area is provided which provides a higher hydrodynamic rigidity, i.e. a higher resistance in the water. The higher resistance in the water provides a resistance against unwanted movements of the floating unit 2 during use. As a result, the displacement of the floating unit 2, e.g. by the semisubmersible columns $3a$, $3b$, $3c$ and their respective end portions $30a$, $30b$, $30c$, may be reduced. The reduction of the displacement enables the reduction of material and thus further lowers the cost of manufacturing the floating unit 2 and wind power platform 1. According to one embodiment, the first and second semisubmersible $3a$, $3b$ are arranged in the floating unit 2 wherein the first and second angle $\alpha_1$, $\alpha_2$ is zero, i.e. wherein the first and second semisubmersible $3a$, $3b$ are not directed away from each other.

Figure 3:
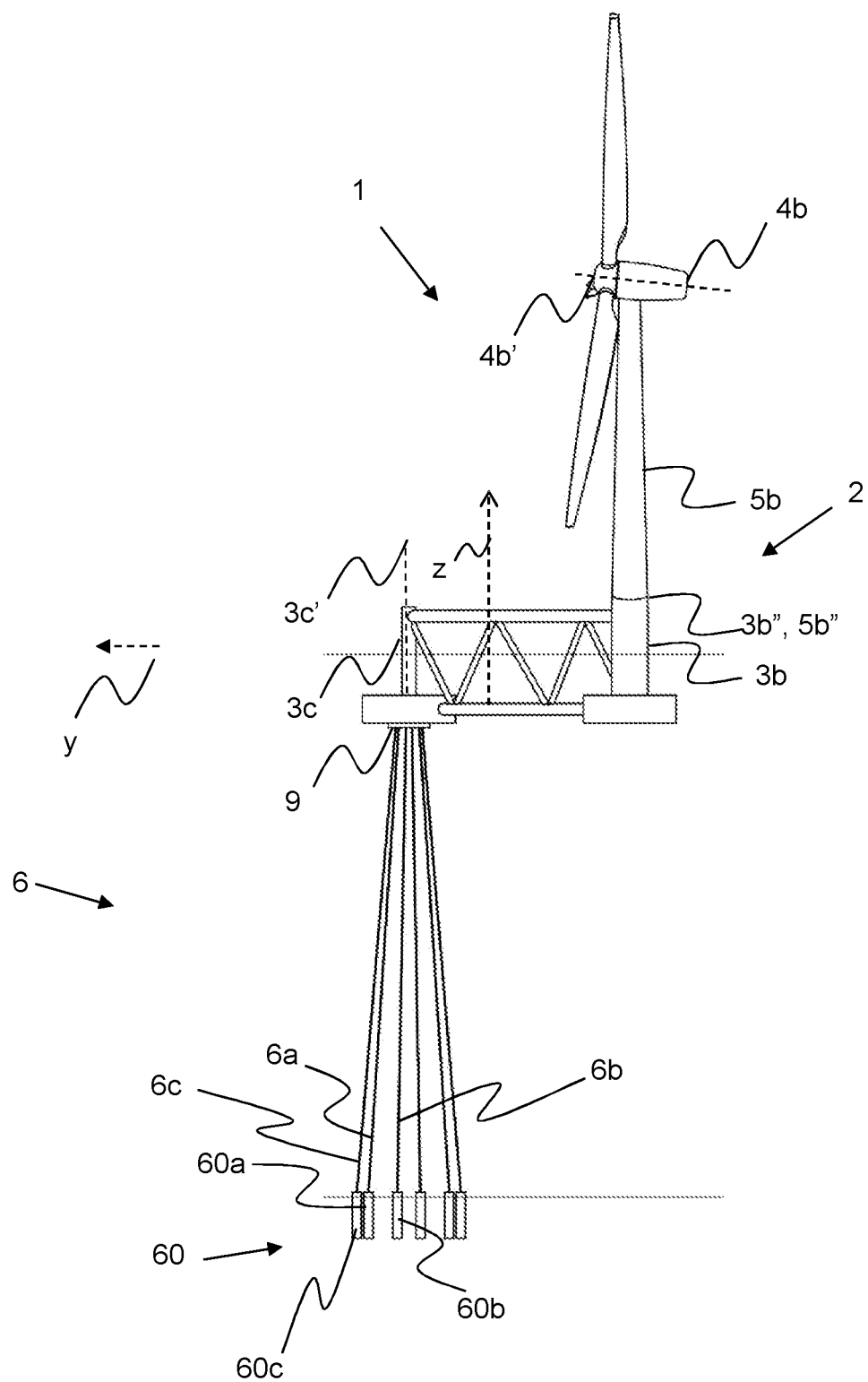
FIG. 3 shows a side view of the floating wind power platform according to FIGS. 1-2.

FIG. 3 shows a side view of the floating wind power platform 1 for offshore power production, as seen perpendicular to the rotational axis $4a'$, $4b'$ of the turbine rotors. As can be seen herein, according to one embodiment, the first and second semisubmersible columns $3a$, $3b$ span a plane, wherein the plane has a normal direction in a horizontal direction y. According to one embodiment, the first and second semisubmersible columns $3a$, $3b$ span a plane, wherein the plane has a normal direction y which is perpendicular to the reference direction z. According to one embodiment, the z and y directions are defined to form or correspond to the axes of a coordinate system as seen in FIG. 2, further comprising a further horizontal direction x. According to one embodiment, the longitudinal central axis $3c'$ of a third semisubmersible column $3c$ is parallel to the reference direction z. According to one embodiment, if the floating unit 2 is shaped as an oblique triangle, the plane spanned by the first and second semisubmersible columns $3a$, $3b$ will not be in a direction parallel to the wind direction during weather vaning, during use when the platform 1 and floating unit 2 has reached a balanced state. Thus, in these cases the plane spanned by the first wind turbine rotor and the second wind turbine rotor will be different planes, and one of the first and second columns $3a$, $3b$ will be an upwind column and the other will be a downwind column.

Figure 4:
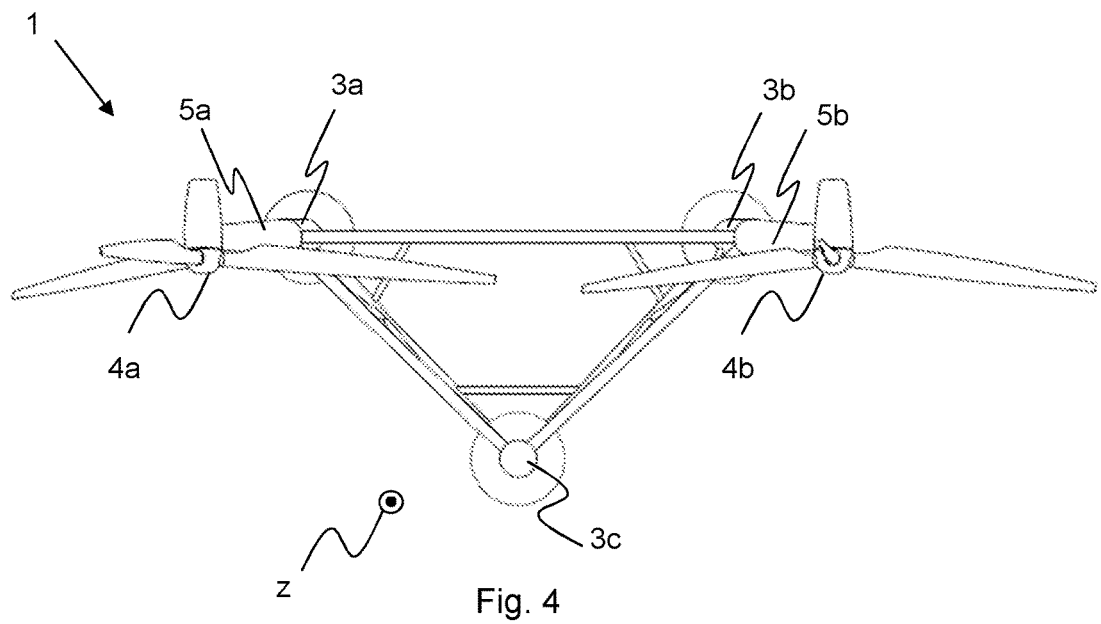
FIG. 4 shows a side view of the floating wind power platform according to FIGS. 1-3.

FIG. 4 shows a side view of the floating wind power platform 1 for offshore power production seen in a negative z-direction.

Figure 5:
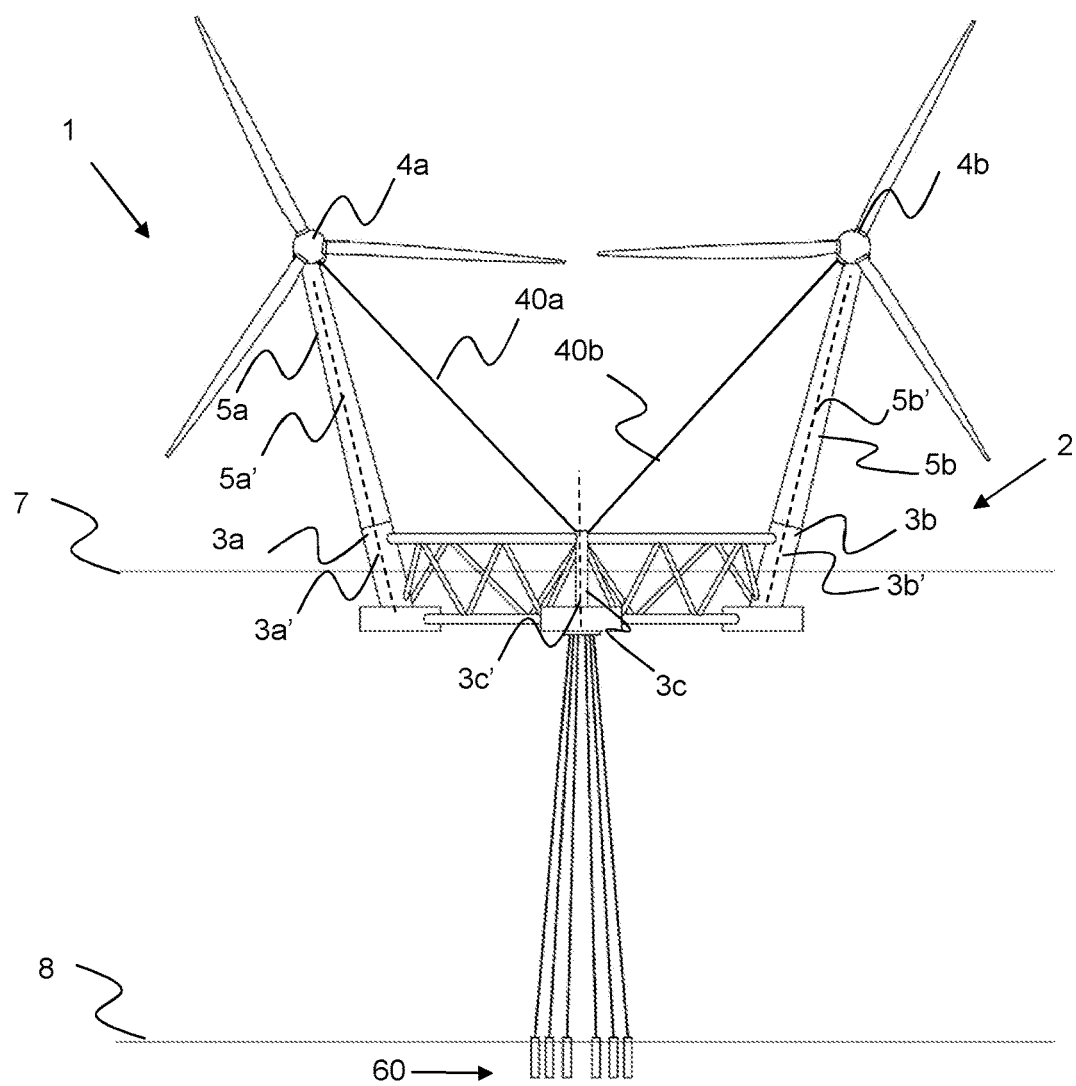
FIG. 5 shows a side view of the floating wind power platform according to FIGS. 1-4.

FIG. 5 shows a side view of the floating wind power platform 1 for offshore power production. As seen herein, according to one embodiment, first and second supporting members $40a$, $40b$ are arranged to interconnect the first and second towers $5a$, $5b$ with the floating unit 2 respectively.

According to one embodiment, at least one supporting member $40a$, $40b$ may be arranged between and interconnecting the two towers $5a$, $5b$. According to one embodiment, the use of supporting members $40a$, $40b$ reduces the stress at the connection point of the towers $5a$, $5b$ with the columns $3a$, $3b$, respectively, such as e.g. at the bolt connections at the abutment surfaces $3a''$, $5a''$, and $3b''$, $5b''$, due to gravitation. According to one embodiment, the use of supporting members $40a$, $40b$ increases the stability of the wind power platform 1. According to one embodiment, the wind turbines $4a$, $4b$ are configured to be rotatable in relation to the wind towers $5a$, $5b$, respectively wherein the axis of rotation is parallel to the longitudinal tower central axis $5a'$, $5b'$. According to one embodiment, the wind turbines $4a$, $4b$ are configured to be rotatable in relation to the wind towers $5a$, $5b$, respectively, wherein the axis of rotation is parallel to the reference direction z. According to one embodiment, the rotation, i.e. a relative angular displacement of the wind turbines with respect to the wind towers $5a$, $5b$, respectively are limited whereby engagement of the wind turbine rotor blades and the wind towers are avoided e.g. during use. According to one embodiment, the limitation is configured to be set by the mechanical construction, such as e.g. a mechanical stop. According to one embodiment, the limitation is configured to be set by a software. According to one embodiment, the wind power platform 1 is configured for energy production by the rotation of the wind turbine rotor blades, and generated in the wind turbines or nacelles by e.g. a generator. According to one embodiment, the offshore power/energy production may be transferred to or brought onshore via an energy cable configured for transferring energy.

A preferred embodiment of a floating wind power platform 1 for offshore power production has been described. However, the person skilled in the art realizes that this can be varied within the scope of the appended claims without departing from the inventive idea.

All the described alternative embodiments above or parts of an embodiment can be freely combined without departing from the inventive idea as long as the combination is not contradictory.

The invention claimed is:

1. A floating wind power platform for offshore power production, comprising:
    a floating unit, wherein the floating unit comprises a first, a second, and a third interconnected semisubmersible column each being arranged in a respective corner of the floating unit, wherein the floating wind power platform further comprising a first and a second wind turbine, arranged to the first and the second semisubmersible columns, respectively, via a first and a second tower respectively,
    wherein a tension leg device is arranged solely to the third semisubmersible column, wherein the tension leg device is adapted to be anchored to a seabed by an anchoring device, wherein the third semisubmersible column provides an upwardly directed excess buoyancy force adapted to create a tension force in the tension leg device, the upwardly directed excess buoyancy force is held by the tension leg device preventing the floating wind power platform from rising; and
    wherein the floating wind power platform is further adapted to weather vane in relation to a wind direction, wherein a turret is arranged to the third semisubmersible column.

2. The floating wind power platform according to claim 1, wherein the tension leg device is arranged to a base end portion of the third semisubmersible column, wherein a diameter $D_{3c}$ of the third semisubmersible column is in an interval of $0{,}1*D_{30c} \leq D_{3c} \leq 0{,}3*D_{30c}$ in relation to a diameter $D_{30c}$ of the base end portion of the third semisubmersible column.

3. The floating wind power platform according to claim 2, wherein the base end portion of the third semisubmersible column is adapted to be entirely submersed in water.

4. The floating wind power platform according to claim 1, wherein a diameter $D_{3c}$ of the third semisubmersible column is in the an interval of $0{,}2*D_{3a/3b} \leq D_{3c} \leq 0{,}6*D_{3a/3}b$ in relation to a diameter $D_{3a/3b}$ of the first and second semisubmersible columns, respectively.

5. The floating wind power platform according to claim 1, wherein the tension leg device comprises at least one tension leg device member.

6. The floating wind power platform according to claim 5, wherein the at least one tension leg device member comprises any one of tension mooring lines, cables, chains, ropes, wires or tubular steel members.

7. The floating wind power platform according to claim 1, wherein the tension leg device comprises a plurality of tension leg device members.

8. The floating wind power platform according to claim 1, wherein the tension leg device is adapted to be arranged essentially vertically between the seabed and the third semisubmersible column.

9. The floating wind power platform according to claim 1, wherein the floating unit is shaped as a triangle wherein corners of the triangle define the corners of the floating unit.

10. The floating wind power platform according to claim 9, wherein a height, h, of the triangle is in a range of 30 m≤h≤70 m.

* * * * *